Sept. 22, 1959 L. N. RODENHOUSE 2,905,172
EYEGLASS MOUNTING FOR GAS MASKS
Filed Jan. 7, 1957
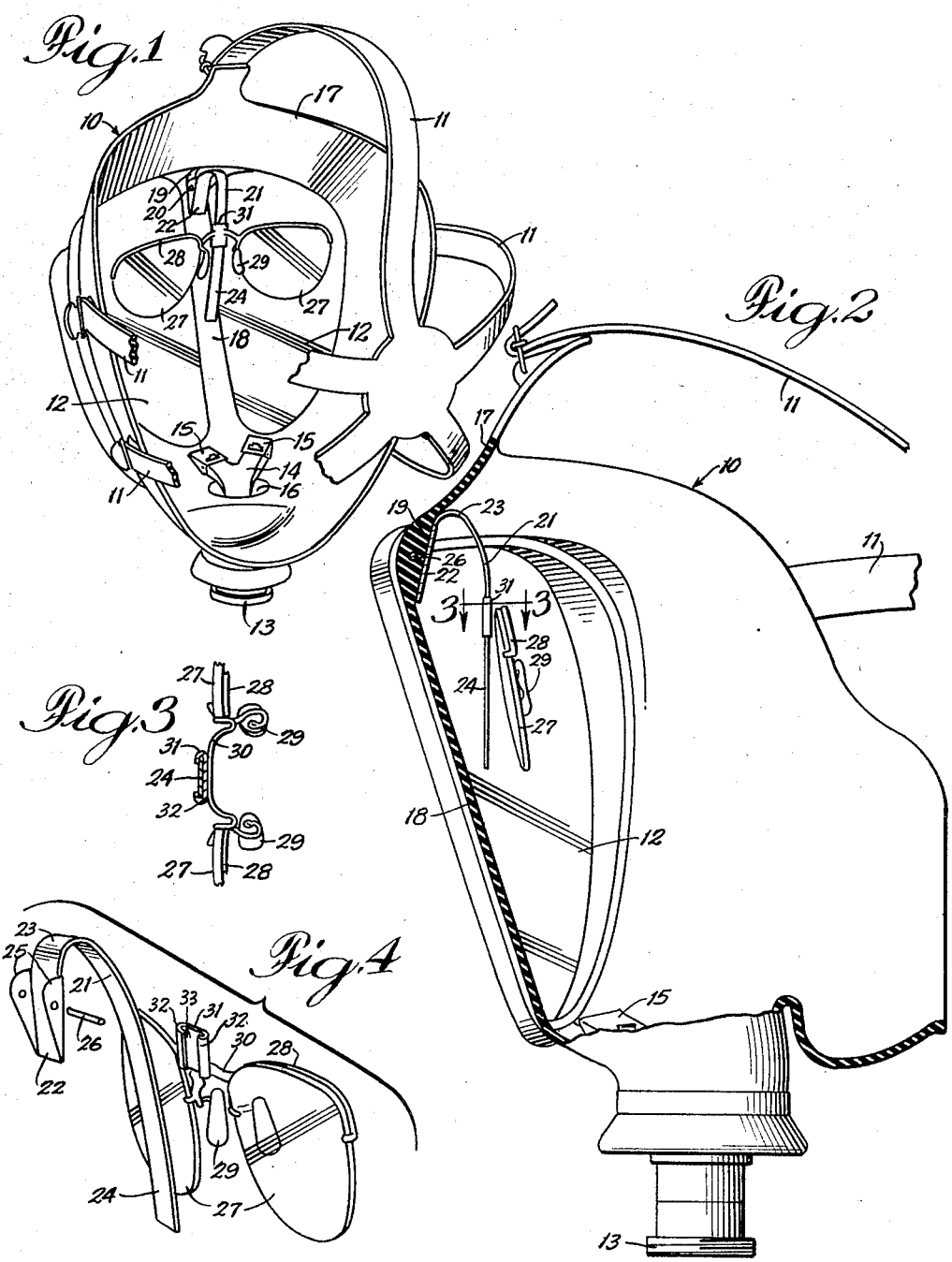
INVENTOR:
Louis N. Rodenhouse,
BY Dawsom, Tilton, Fallon & Lungmus,
ATTORNEYS.

United States Patent Office 2,905,172
Patented Sept. 22, 1959

2,905,172

EYEGLASS MOUNTING FOR GAS MASKS

Louis N. Rodenhouse, South Haven, Mich., assignor to Acme Protection Equipment Company, South Haven, Mich., a partnership Application January 7, 1957, Serial No. 632,794

7 Claims. (Cl. 128—141)

This invention relates to gas masks, and more particularly, to an improved means for detachably and adjustably mounting corrective eyeglass lenses upon gas masks.

In the past, gas masks were provided with relatively small round openings in which circular lenses were removably mounted. If a wearer's eyesight required correction, then the original lenses of the mask were removed and replaced with corrective lenses of the same diameter. However, such masks had the marked disadvantage of greatly restricting the wearer's field of vision because of the circular shape and relatively small diameter of the windows or openings.

In general, present masks now have relatively large, non-circular openings which allow a wide visual range, thereby eliminating or significantly reduced the aforementioned defect of earlier masks. However, the large size and irregular shape of these openings render the use of interchangeable corrective lenses impractical, if not technically impossible, and instead, require the use of additional or secondary lenses of smaller dimensions in those instances where a wearer's eyesight needs optical correction.

While it has been a frequent practice for users to wear ordinary spectacles underneath conventional, present-day gas masks, such a practice is generally inadvisable because of the danger involved. The ear-pieces or bows of the spectacles tend to prevent a snug fit of the mask about the wearer's face, thereby causing leakage which interferes with efficient operation of the apparatus and reduces the mask's effectiveness in protecting the wearer from noxious gases or harmful particles carried in the surrounding atmosphere. Furthermore, the spectacles are difficult to adjust after the mask is in place and, where the mask is to be worn for extended periods of time, a wearer is likely to suffer considerable discomfort resulting from the pressure of the ear-pieces clamped against his temples by the side portions of the mask.

Accordingly, one of the principal objects of the present invention is to provide an eyeglass support structure for gas masks which overcomes the aforementioned defects and disadvantages. Another object is to provide a gas mask equipped with a detachable eyeglass mounting structure upon which corrective lenses may be positioned and easily adjusted to suit the individual facial characteristics of a wearer. In this connection, it is also a specific object of the present invention to provide an elongated connecting member for attaching an eyeglass frame to a mask, the connecting member being bendable to conform with the facial characteristics of a wearer and being flexible to absorb or cushion impacts and protect a person wearing the mask.

Other objects will appear from the specification and drawings, in which—

Figure 1 is a perspective view of a mask broken away to expose the structure of the present invention;

Figure 2 is an enlarged broken vertical section of the mask shown in Figure 1;

Figure 3 is a broken cross-section of the support structure taken along line 3—3 of Figure 2; and Figure 4 is an exploded perspective view of the support structure and eyeglass assembly.

Referring to the drawings, Figure 1 illustrates a gas mask designated generally by the numeral 10, and equipped with adjustable head straps 11, a pair of windows or lenses 12, and a threaded tubular fitting 13. Fitting 13 is adapted to threadedly receive a conventional canister-type filter (not shown) or any other suitable air filtering device, and communicates with the interior of the mask through branched conduit 14. Valve members 15 are pivotally mounted at the upper ends of the branched inflow conduit and prevent the reverse flow of air through that conduit, the air exhaled by the wearer being exhausted through the large concentric passage 16. The mask itself is formed principally of rubber or other resilient stretchable material, and has a peripheral edge portion 17 which fits snugly about the wearer's face to prevent leakage along that portion. Since the aforementioned structure is entirely conventional, a more detailed description of this structure is believed unnecessary for purposes of disclosing the present invention.

Between the windows or lenses 12 is a generally vertical septum 18 which is formed integrally with the body of the mask. At its upper portion, this septum is provided with a wedge-shaped enlargement 19 which has a transverse or horizontal opening 20 extending therethrough. This wedge portion of the septum provides a sturdy and yet somewhat resilient mounting for the spectacle lens support assembly which will now be described.

As illustrated most clearly in Figure 4, I provide an eyeglass support arm 21 having a front portion 22, a curved intermediate portion 23, and a substantially straight depending rear portion 24. The front portion of the reversely turned arm is equipped with forwardly extending vertical ears 25 which are apertured to receive a pin 26. Hence, the support arm may be easily and quickly mounted upon the mask by placing ears 25 on opposite sides of wedge portion 19 and then inserting pin 26 through the aligned openings of the septum's wedge portion and the support member's parallel ears.

The eyeglass structure comprises a pair of corrective lenses 27 and a frame 28 securely connecting the two lenses in properly spaced relation. The frame or "front" is provided with conventional nose pads 29 and a bridge 30. However, it will be noted that a clasp or clamp 31 is provided by the bridge and has a pair of vertical edges 32 turned forwardly and inwardly to define a channel 33. This channel slidably receives the depending rear portion 24 of the reversely turned support arm to provide an adjustable connection between the arm and the eyeglass frame.

Preferably, the support arm is formed of steel or other suitable metal which has spring qualities, and which, at the same time, may be bent to conform with the facial characteristics of a wearer. Consequently, the depending rear portion of the arm may be curved or bent to extend along the ridge of the wearer's nose while the spring action of the arm exerts a gentle rearward pressure to maintain the eyeglass lenses in proper position in front of the wearer's face. The gradual curvature of the arm's intermediate portion 23 and the reversely turned character of that arm facilitates the spring action of the strip to provide a comfortable and highly effective eyeglass mounting assembly. It will be evident, also, that the spring arm affords considerable protection for the wearer by absorbing or cushioning blows against the windows or front portion of the mask.

As pointed out above, the clamp or channel member 31 is slidable along the depending rear portion of the arm so that the spectacle lenses and frame may be shifted to the most suitable elevation for the particular wearer. However, the snug frictional engagement between the channel member and the arm serves to maintain the glasses in their selected position. Furthermore, where the portion of the arm below the channel member has been bent forwardly to conform to the wearer's nose, the bend of the arm below member 31 will operate to lock the eyeglass frame in position and prevent downward movement of the channel member until the depending portion is again straightened.

It is believed evident from the foregoing that the present invention involves a highly effective support for corrective eyeglass lenses in connection with gas masks and eliminates the need for earpieces or bows to maintain those glasses in proper position. As a result, leakage which might otherwise tend to occur along the spectacle bows is completely eliminated.

While in the foregoing I have disclosed an embodiment of the present invention in considerable detail for purposes of illustration, it will be understood that many of these details may be varied without departing from the spirit and scope of the invention.

I claim:

1. In a gas mask, an eyeglass support arm immovably mounted upon said mask and having a flexible and bendable depending portion being adapted to extend downwardly along the ridge of a wearer's nose and terminating in a free lower end, an eyeglass frame having a central nose bridge, and means provided by said bridge for slidably securing said frame to the depending portion of said support arm and for adjusting the vertical position of said frame therealong.

2. The structure of claim 1 in which said arm comprises a reversely-turned strip of spring metal having a front portion fixed to said mask, a curved intermediate portion, and a depending rear portion being spaced behind and extending below said front portion.

3. The structure of claim 1 in which said means comprises a channel member provided by said bridge, said member providing a channel for snugly and slidably receiving the depending portion of said support arm.

4. In a gas mask having a pair of windows with a septum therebetween, a support structure for supporting a pair of corrective lenses comprising a frame connecting said lenses and having a central bridge portion, a frame support arm having a front portion mounted upon said septum and having a reversely-turned depending rear portion extending along said septum, and clamping means provided by said bridge for slidably clamping said frame upon the depending portion of said support arm.

5. The structure of claim 4 in which the depending portion of said arm is bendable to conform with the facial characteristics of a wearer.

6. The structure of claim 4 in which said septum is provided adjacent the upper end thereof with a wedge-shaped enlargement, said front portion of said arm being provided with forwardly projecting ears adjacent opposite sides of said wedge portion, and a removable pin extending through said ears and said wedge-shaped portion for detachably securing said support arm to said mask.

7. In a gas mask, a support structure for supporting a pair of corrective lenses comprising an eyeglass front providing a mounting for said corrective lenses and having a central nose bridge, a support arm having a forward portion secured to the forward portion of said mask and having a reversely turned depending rear portion extending downwardly between said corrective lenses, and clamping means provided by said nose bridge for slidably clamping said front upon the depending rear portion of said support arm.

References Cited in the file of this patent

UNITED STATES PATENTS

| | | |
|---|---|---|
| 349,018 | Waddell | Sept. 14, 1886 |
| 2,301,050 | Kelley | Nov. 3, 1942 |
| 2,737,659 | Glidden | Mar. 13, 1956 |